UNITED STATES PATENT OFFICE.

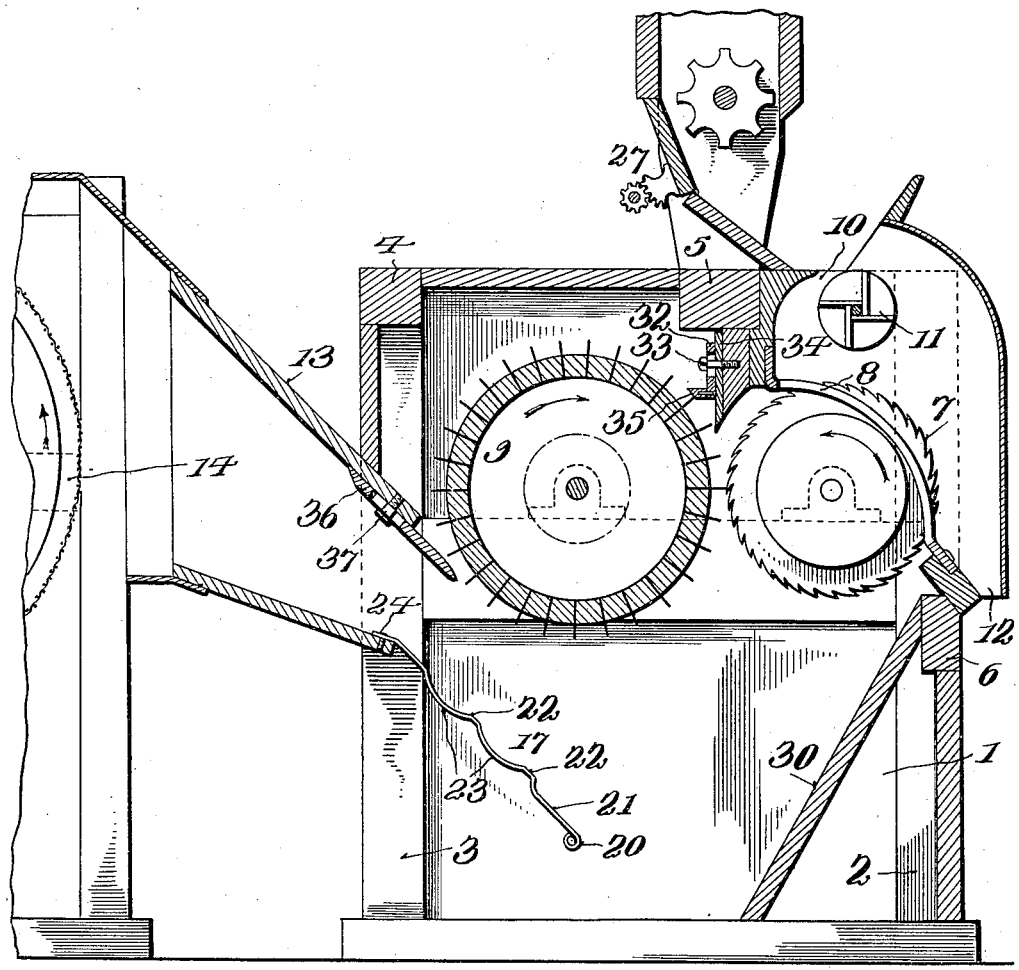

HUGH E. SESSIONS, OF COLUMBIA, SOUTH CAROLINA.

COTTON-SEED LINTER.

1,077,435.   Specification of Letters Patent.   Patented Nov. 4, 1913.

Application filed June 27, 1912.   Serial No. 706,250.

*To all whom it may concern:*

Be it known that I, HUGH E. SESSIONS, a citizen of the United States, residing at Columbia, county of Richland, and State of South Carolina, have invented certain new and useful Improvements in Cotton-Seed Linters, of which the following is a specification.

This invention consists in certain improvements on the cotton-seed linter disclosed in my prior Patent No. 962,722, granted June 28, 1910, and it has been my purpose by the novel features hereafter described to still further improve the operation of the machine in separating the lint from trash and foreign matter.

The novel features of the invention will be apparent from the following description taken in connection with the accompanying drawing.

In the drawing I have shown a section of a machine embodying the various features of my invention.

As set forth in my prior patent the purpose of the machine is to remove lint from seed which have previously been ginned and to recover the lint so removed free from the trash motes and other foreign matter which may be mixed with it as it is brushed down by the brush cylinder.

This means for removing the lint from the seed is embodied in a casing 1 having the upright corner posts 2 and 3 and the cross pieces 4, 5 and 6. In this casing a new cylinder 7 is mounted embodying a gang of saws passing between the saw ribs 8 as will be clearly understood by those skilled in the art. A brush cylinder 9 is mounted by the side of the saw cylinder having brush points engaging the teeth of the saw and adapted to rotate at a higher rate of speed than the saw cylinder. The two cylinders rotate in the direction indicated by the arrows, and because of the higher rate of speed of the brush cylinder the cotton is brushed from the teeth of the saws down toward the floor or platform on which the casing 1 is mounted. Preferably the ends of the brush should just touch the points of the saw teeth, the lint being drawn from the saws principally by the draft created by the brush. The cotton seeds are fed to the apparatus through the opening 10 in any suitable way, and the amount fed to the saws is regulated by the feed mechanism 27. The float 11 agitates the seed and assists in properly presenting them to the saws. It will be understood that the lint is carried by the saw teeth between the ribs 8 until it reaches the brush and that the seed pass down the ribs and out through the opening 12.

A flue 13 leads upwardly from the lower edge of the brush cylinder 9 and discharges the lint upon a cylinder 14 covered with wire cloth which revolves in the direction indicated by the arrow. The lint is deposited on the cylinder 14 in the form of a layer which may be removed in the manner shown in my Patent No. 962,722. It will be understood that the draft which carries the lint up through the flue 13 is created by the brush cylinder 9 which rotates at high speed immediately above the entrance of that flue.

As set forth in my prior patent the arrangement of the mote board 17 at an angle of about 45° extending down to a point near the floor of the casing whereby a large space is left when it and the brush cylinder 9 brings about a very decided improvement in the separation of the lint from the trash. The lint is discharged downward by the brush cylinder and under the influence of the gentle current created out through the flue 13, it floats first downwardly and then up and out through the flue, the heavy particles and trash falling to the floor of the casing and practically all of the lint being recovered. I have found that the use of an inclined rear wall 30 for the casing still further improves the separating action, that wall 30 extending across the casing and at an angle from a point in front of and beneath the saw cylinder downwardly and inwardly to the floor. It serves to prevent any inward draft of air at that point and seems to have a beneficial effect owing to its inclination in directing upwardly the air which is admitted beneath the mote board 17, and by its inclined position it also avoids a sharp corner or pocket at the bottom of the casing in which the air would be more or less dead and in which material will collect.

In addition to the rear wall 30 I have found that improved results are produced by the use of a mote board having ribs or corrugations on its upper surface extending transversely or in other words in a horizontal position where the draft of air passes across them as it moves out toward the flue 13. I preferably make the mote board of sheet metal which may be galvanized sheet iron and that metal is simply bent to the shape desired. The lower edge is curved into a roll 20 which serves to strengthen it and the lower portion 21 is made with a flat smooth upper surface so as to furnish a free passage for the air. Ribs 22 having flat upper surfaces are formed by bending or corrugating the metal and the upper surfaces of these ribs are preferably made about one inch in width. Between the ribs there are depressions 23 formed by a gradual concave portion, these concave portions preferably being about three and one half inches wide. The upper end of the mote board may be simply bent over the inner end of the flue 13, and screws may be passed through it into the flue to hold the board in place. It will be seen, however, that the invention is not limited to this fastening means and that the board may be hinged and adjustable as indicated in my prior patent. I find that the corrugations on the surface of the mote board have some effect on the current of air passing up in close contact with that board and that they tend to prevent motes and particles of trash from traveling up and into the flue creating slight eddies in the air passing over them.

The separating action of the machine is also improved by proper regulating means for controlling the admission of air carried down into the chamber by the brush cylinder and also proper regulation of the discharge of air on the opposite side of the brush cylinder. I therefore make use of an improved form of regulating means carried by the division board above and between the saw cylinder and the brush cylinder. That regulating means includes a vertically movable board 32 which has vertical slots in it through which the bolts 33 pass to secure the board in proper position on the fixed support 34. At the lower end of the board 32 there is a horizontal extension 35 which reaches out to a point above and close to a line of the bristles on the brush cylinder, and by a vertical adjustment of the board 32 the distance of the extension 35 from the ends of the bristles is controlled and thus the passage of air down with the bristles is regulated. This lateral extension makes it easier to see just what adjustment is being secured than would be the case with the board extending straight down in between the two cylinders.

In order to regulate the discharge of air on the opposite side of the brush cylinder I make use of an adjustable board which approaches the ends of the bristles and cuts off the air, and the drawing shows one arrangement which I have used for this purpose. It includes the adjustable board 36 having slots in it through which the bolts 37 pass for holding it in adjusted position, the lower inner edge of the board approaching the bristles. The upper edge of the board is beveled so as not to present a sharp edge where the air passes out through the flue 13.

Having thus described the invention what is claimed and desired to be secured by Letters Patent is:

1. In a cotton seed linter, the combination with a casing forming a substantially closed chamber, of a saw cylinder, a brush cylinder adapted to discharge lint downwardly from said saw cylinder into said chamber, a flue for the lint leading from said casing on the side next to said brush cylinder, a mote board widely separated from said brush cylinder extending inwardly and downwardly at an angle of approximately forty-five degrees from said flue to a point above the floor leaving an inlet for air beneath its edge, and a rear wall for said chamber on the side next to said saw cylinder extending inwardly and downwardly to the floor of the chamber at an angle.

2. In a cotton seed linter, the combination with a casing forming a substantially closed chamber, of a saw cylinder, a brush cylinder adapted to discharge lint downwardly from said saw cylinder into said chamber, a flue for the lint leading from said casing on the side next to said brush cylinder, a mote board widely separated from said brush cylinder extending inwardly and downwardly at an angle of approximately forty-five degrees from said flue to a point above the floor leaving an inlet for air beneath its edge, and a rear wall for said chamber on the side next to said saw cylinder extending inwardly and downwardly to the floor of the chamber at an angle and adjustable means for regulating the passage of air down between said brush and saw cylinders into said chamber.

3. In a cotton seed linter, the combination with a casing forming a substantially closed chamber, of a saw cylinder, a brush cylinder adapted to discharge lint downwardly from said saw cylinder into said chamber, a flue for the lint leading from said casing on the side next to said brush cylinder, a mote board having horizontal ridges on its upper surface widely separated from said brush cylinder extending inwardly and downwardly at an angle of approximately forty-five degrees from said flue to a point above the floor leaving an inlet for air beneath its edge and a rear wall for said chamber on the side next to said saw cylinder extending inwardly and downwardly to the floor of the chamber at an angle.

4. In a device of the class described, the combination with a saw cylinder, of a brush cylinder adapted to discharge lint downwardly, a mote board widely separated therefrom arranged at an angle of about forty-five degrees, and a casing forming an unobstructed chamber to receive the downwardly directed lint so constructed as to admit air below said mote board but prevent side drafts up to the peripheral line of said saw cylinder, the said mote board having transverse separated ribs on its upper surface.

5. In a device of the class described, the combination with a saw cylinder, of a brush cylinder adapted to discharge lint downwardly, a mote board widely separated therefrom arranged at an angle of about forty-five degrees, and a casing forming an unobstructed chamber to receive the downwardly directed lint so constructed as to admit air below said mote board but prevent side drafts up to the peripheral line of said saw cylinder, the said mote board having transverse separated ribs on its upper surface with concave depressions between them and a flat smooth surface at the lower edge.

6. In a device of the class described, the combination with a saw cylinder, of a brush cylinder, a mote board widely separated therefrom arranged at an angle of about forty-five degrees, the said mote board being formed of sheet metal corrugated to form ribs on its upper surface and having a smooth flat portion at the lower edge.

7. In a device of the class described, the combination with a saw cylinder, of a brush cylinder, a mote board widely separated therefrom arranged at an angle of about forty-five degrees, the said mote board being formed of sheet metal corrugated to form ribs on its upper surface with flat tops and concave depressions between them and the lower portion being flat and terminating in a roll.

8. A sheet metal mote board having transverse corrugations.

9. A sheet metal mote board having transverse corrugations with flat tops and concave depressions and one end of the board being flat terminating in a roll.

10. In a device of the class described, the combination with a saw cylinder, of a brush cylinder mounted by the side of said saw cylinder and adapted to brush the lint downwardly from said saw cylinder, an adjustable division board above and between said cylinders, the said board having a lateral portion adapted to approach the ends of the bristles on the brush in accordance with the adjustment to regulate the admission of air between the cylinders, and a mote board extending downwardly beneath the brush cylinder but widely separated therefrom upon the side opposite the saw cylinder.

11. In a device of the class described, the combination with a saw cylinder, of a brush cylinder mounted by the side of said saw cylinder and adapted to brush the lint downwardly from said saw cylinder, and an adjustable division board above and between said cylinders having a horizontal extension or edge extending over and close to the ends of the bristles on said brush whereby the vertical adjustments of the board will regulate the air carried down by the bristles.

In testimony whereof I affix my signature in presence of two witnesses.

HUGH E. SESSIONS.

Witnesses:
 DAVID KING,
 J. F. GAINES.

---

Copies of this patent may be obtained for five cents each, by addressing the "Commissioner of Patents, Washington, D. C."